United States Patent
Gulati et al.

(10) Patent No.: US 9,686,352 B2
(45) Date of Patent: Jun. 20, 2017

(54) SATURATION DETECTION AND ADMISSION CONTROL FOR STORAGE DEVICES

(71) Applicant: VMware, Inc., Palo Alto, CA (US)

(72) Inventors: Ajay Gulati, Palo Alto, CA (US); Ganesha Shanmuganathan, Mountain View, CA (US); Irfan Ahmad, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/280,579

(22) Filed: Sep. 29, 2016

(65) Prior Publication Data

US 2017/0019465 A1    Jan. 19, 2017

Related U.S. Application Data

(63) Continuation of application No. 12/869,878, filed on Aug. 27, 2010, now Pat. No. 9,467,505.

(51) Int. Cl.
| | |
|---|---|
| *G06F 15/16* | (2006.01) |
| *H04L 29/08* | (2006.01) |
| *H04L 12/26* | (2006.01) |

(52) U.S. Cl.
CPC ...... *H04L 67/1008* (2013.01); *H04L 43/0852* (2013.01); *H04L 43/16* (2013.01); *H04L 43/50* (2013.01); *H04L 67/1002* (2013.01); *H04L 67/1097* (2013.01)

(58) Field of Classification Search
CPC .................................................. H04L 67/1008
USPC .................................................. 709/224, 226
See application file for complete search history.

(56) References Cited

U.S. PATENT DOCUMENTS

| | | |
|---|---|---|
| 2010/0083274 A1 | 4/2010 | Green et al. |
| 2010/0281208 A1 | 11/2010 | Yang |

OTHER PUBLICATIONS

A Gulati et al. "PARDA: Proportional Allocation of Resources for Distributed Storage Access," 7th USENIX Conference on File and Storage Technologies, Feb. 2009, pp. 85-98.
Office Action dated May 29, 2012 for U.S. Appl. No. 12/869,878.

*Primary Examiner* — Adnan Mirza

(57) ABSTRACT

Maximum throughput of a storage unit, and workload and latency values of the storage unit corresponding to a predefined fraction of the maximum throughput are estimated based on workloads and latencies that are monitored on the storage unit. The computed metrics are usable in a variety of different applications including admission control, storage load balancing, and enforcing quality of service in a shared storage environment.

20 Claims, 12 Drawing Sheets

SATURATION DETECTION AND ADMISSION CONTROL FOR STORAGE DEVICES

CROSS REFERENCE TO RELATED APPLICATION

This application is a continuation which claims priority from U.S. patent application Ser. No. 12/869,878, filed Aug. 27, 2010 and entitled "Saturation Detection and Admission Control for Storage Devices," which is hereby incorporated by reference.

BACKGROUND

Data center management functions, such as capacity planning, provisioning, configuring workloads, migration of workloads, and making procurement decisions, rely on performance estimates for storage systems within the data center. To provide the performance estimates, the storage systems are characterized according to certain usage models. In general, storage systems are characterized in terms of total storage capacity and transaction performance. Total storage capacity is commonly specified as a byte count (e.g., a number of terabytes of storage). Transaction performance is commonly specified as an average number of input/output (IO) operations per second (IOPS). In a given storage system, total storage tends to be very precisely characterized, while IOPS performance tends to be very poorly and imprecisely characterized. In fact, characterizing a storage system with respect to IOPS performance is a well-known, unsolved problem within the art of storage systems.

To achieve some degree of useful characterization, a storage system is typically given an IOPS specification based on an offline, static benchmark. However, conventional IOPS benchmarks do not reflect dynamic relationships that impact performance of an online system, and the benchmarks cannot easily predict performance for a diverse mix of workloads and typically only work effectively for a narrow range at a time. Furthermore, conventional benchmarks are not well configured for operation on a system servicing live traffic. A typical online system may commonly operate outside the narrow range, yielding IOPS performance that is inferior to that predicted by the static benchmarks.

In order to guarantee required overall performance without a predictive performance model, worst-case performance estimates are commonly employed as a model for storage systems in data center environments. This worst-case modeling typically results in extremely over-provisioned, over-built data center storage systems. Because storage systems oftentimes comprise a significant portion of data center capital and operations expense, over-building these systems can dramatically increase total cost of ownership of a given data center. Therefore, what is needed in the art is a technique for better characterizing storage systems with respect to IOPS performance that is operable over a broader range of operating conditions.

SUMMARY

One or more embodiments of the present invention provide a method of estimating maximum throughput of a storage unit, and workload and latency values corresponding to a predefined fraction of the maximum throughput.

A method of estimating throughput of a storage unit, according to an embodiment of the invention, includes the steps of monitoring a workload on the storage unit and a latency of the storage unit at multiple points in time over a period of time, and determining a maximum throughput of the storage unit based on a linear relationship between workloads and latencies monitored on the storage unit.

A method of controlling admissions of a workload into a storage unit, according to an embodiment of the invention, includes the steps of computing a threshold latency corresponding to a predefined fraction of a maximum throughput of the storage unit, estimating a total latency that would result if the workload is admitted, comparing the estimated total latency with the threshold latency, and admitting the workload if the estimated total latency is less than the threshold latency.

A method of load balancing workloads across storage units, according to an embodiment of the invention, includes the steps of selecting a workload for migration to a destination storage unit, determining whether or not migration of the selected workload to the destination storage unit will cause the destination storage unit to reach a predefined fraction of a saturation workload, and migrating the selected workload to the destination storage unit if the predefined fraction of the saturation workload of the storage unit will not be reached.

A method of enforcing a quality of service policy for a system having a plurality of hosts sharing a common storage unit, according to an embodiment of the invention, includes the steps of determining an average latency across all of the hosts, comparing the average latency with a threshold latency, and adjusting IO issue queue size of the host if the threshold latency is reached, wherein the threshold latency is determined as the latency of the common storage unit operating at a predefined fraction of maximum throughput.

Other embodiments include, without limitation, a computer-readable storage medium that includes instructions that enable a processing unit to implement one or more aspects of the disclosed methods.

DETAILED DESCRIPTION

Figure 1A:
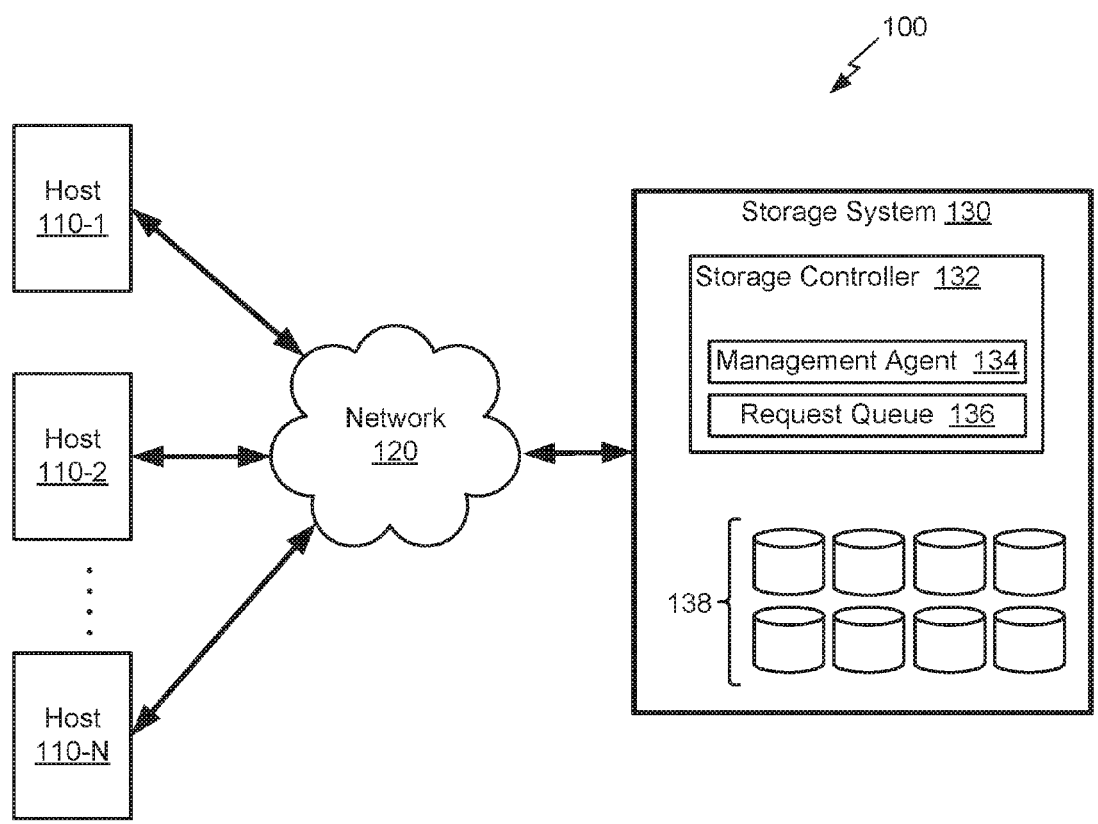
FIG. 1A is a block diagram of an exemplary data center system, configured to implement one or more aspects of the present invention.

FIG. 1A is a block diagram of an exemplary data center system 100, configured to implement one or more aspects of the present invention. The data center system 100 comprises a plurality of hosts 110, a data network 120, and a storage system 130. There may be an arbitrary number of hosts 110, each comprising a computation platform such as a general purpose computer system. Each host 110 is configured to execute one or more applications, virtual machines, or other software clients that access data stored within the storage system 130. Data network 120 may comprise any technically feasible networking system or set of systems, and may operate according to any technically feasible communications technology. For example, data network 120 may implement an industry standard Ethernet switched network, internet protocol (IP) routed network, or any combination thereof. Alternately, the data network 120 may implement a Fibre Channel switched network. The clients executing on hosts 110 access data on the storage system 130 via the data network 120.

The storage system 130 includes a storage controller 132 and one or more storage devices 138, such as magnetic disk drives, solid-state disks (SSDs), or any other technically feasible type of storage device. The storage controller 132 may comprise one or more instances of a hardware computing platform, such as a general purpose computer system. The storage controller 132 may also include hardware elements specifically designed for performing computations related to storage systems. The storage system 130 is configured to execute at least one instance of a management agent 134. The management agent 134 presents one or more block disk volumes, one or more file systems, or any combination thereof to the clients via corresponding storage protocols. For example, a block disk volume may be presented via the industry standard Internet small computer system interface (iSCSI)) protocol. Similarly, a file system may be presented via the industry standard network file system (NFS) protocol.

The management agent 134 maintains a request queue 136 of pending storage requests posted by the clients running on hosts 110. At any instant in time, a number of pending requests defines an instantaneous workload for the storage system 130. An average number of pending requests, taken over an arbitrary length of time, defines an average load (N) for the storage system 130. For an individual pending request, a length of time needed to service the request defines an individual request latency, which is a function of the type of request and internal state of the storage system 130. An average of individual request latency values defines an average latency (L) for the storage system 130. An average rate with which the storage system 130 services requests defines a throughput (T), measured in IO operations per second (IOPS). A given storage system 130, when subjected to varying load conditions, may exhibit a wide range of IOPS performance.

Figure 1B:
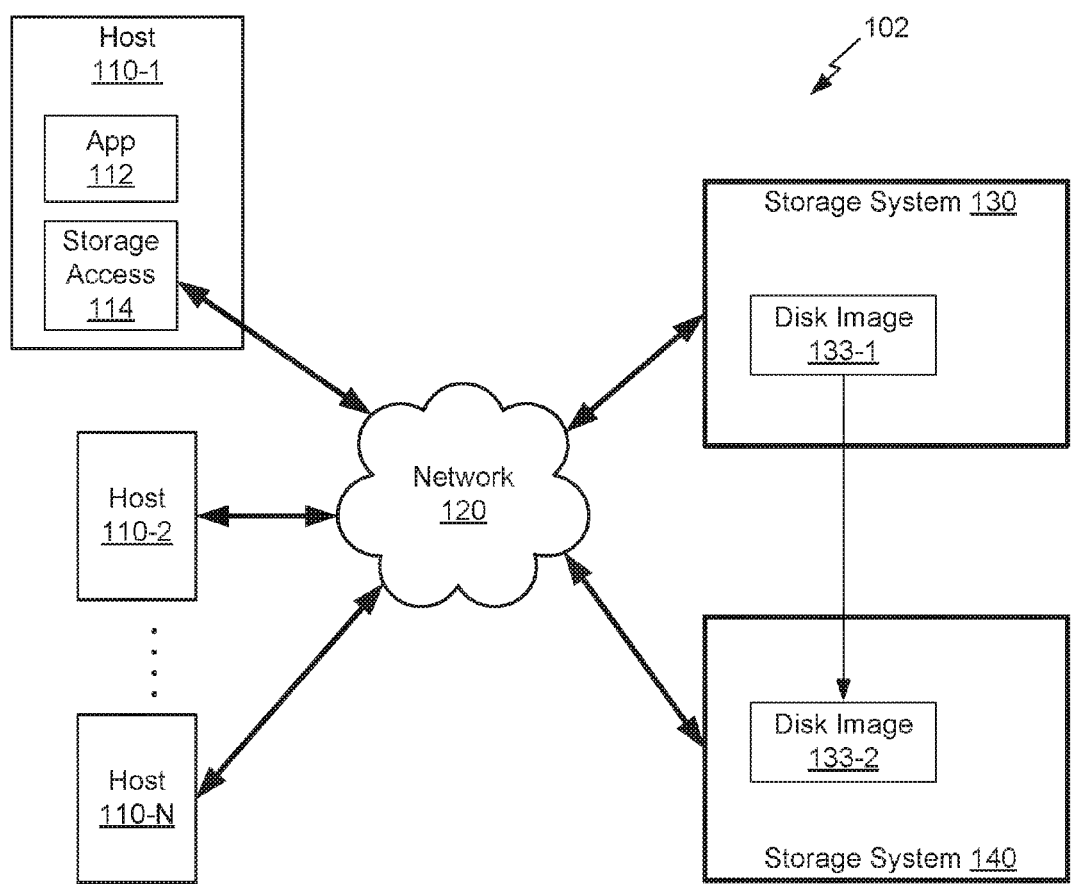
FIG. 1B is a block diagram of an exemplary data center system comprising two data storage systems, configured to implement one or more aspects of the present invention.

FIG. 1B is a block diagram of an exemplary data center system 102 comprising two data storage systems 130, 140 configured to implement one or more aspects of the present invention. The data center system 102 comprises hosts 110, network 120, storage system 130 of FIG. 1A, as well as storage system 140. Host 110-1 is configured to execute application 112, which accesses disk image 133-1, residing in storage system 130. In one embodiment, disk image 133-1 is identified within storage system 130 using a logical unit number (LUN).

Disk image 133-1 may be transparently migrated to storage system 140 by storage access module 114. Disk image 133-1 is stored within storage system 140 as disk image 133-2. Storage access module 114 remaps access requests from application 112 targeting the LUN for disk image 133-1 to target disk image 133-2. In this way, application 112 is able to transparently access disk image 133-2 using an initial LUN number assigned for disk image 133-1. Storage access module 114 may initiate a migration from storage system 130 to storage system 140 based on performance metrics measured for the two storage systems. The storage metrics include, without limitation, present latency, present load, and present percentage of maximum throughput. It should be recognized that the disk image and the unit of migration from one LUN to another LUN may be a file or a group of files.

Figure 2A:
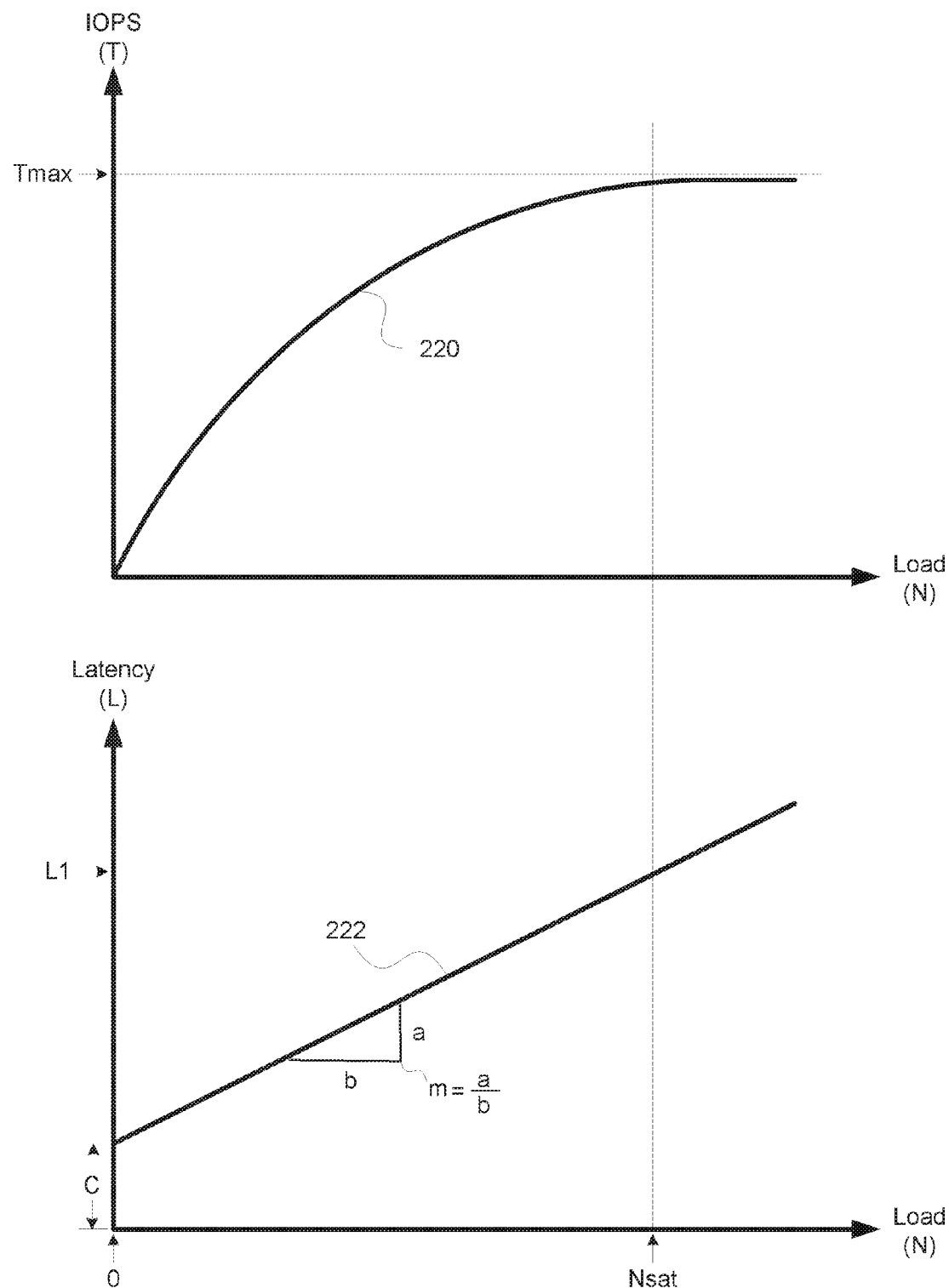
FIG. 2A illustrates relationships among load, latency, and throughput in an arbitrary storage system, according to one embodiment of the present invention.

FIG. 2A illustrates relationships among load (N), latency (L), and throughput (T) in an arbitrary storage system, according to one embodiment of the present invention. As shown by throughput response function 220, increasing load N results in an increase in throughput T, up to a maximum throughput of Tmax. Saturation load Nsat represents a load N that yields maximum throughput Tmax. As shown by latency response function 222, increasing load N arbitrarily results in an arbitrarily large increase in latency L. Saturation latency L1 occurs at load Nsat. The latency response function 222 is characterized by a substantially linear response, with a zero intercept (C) and a slope (m).

Embodiments of the present invention disclose a technique for relating average load, latency, and throughput to beneficially facilitate performance estimation of storage systems in general. Importantly, the performance estimation process may be performed while a given storage system is online and potentially servicing other live client traffic. The relationship among average load, latency and throughput is derived in Equations 1-6, below.

In queuing theory, Little's Law states that the average queue depth for a single service request queue is given by the product of average request latency and average request throughput. Little's Law is expressed below in Equation 1.

$$\text{AverageQueueDepth} = \text{AverageLatency} \cdot \text{AverageThroughput} \quad \text{(Equation 1)}$$

Little's Law may be restated in Equation 2, below, where the average load N of the storage system is the product of the average latency L and average throughput T.

$$N = L \cdot T \quad \text{(Equation 2)}$$

Average latency L as a function of load N is generally characterized as a substantially straight line, as illustrated by the latency response function 222. The latency response function 222 may therefore be generally described by Equations 3A and 3B, below. Equation 3A describes a simple straight line, while Equation 3B describes a substantially straight line that quickly approaches a straight asymptote with slope m. In certain settings, Equation 3B may more precisely predict average latency L. Small deviations from a strictly linear function are contemplate by certain embodiments, and should be considered to be within the scope and spirit of the present invention.

$$L = m \cdot N + C \qquad \text{(Equation 3A)}$$

$$L = m \cdot N + \frac{C \cdot N}{(N+2)} \qquad \text{(Equation 3B)}$$

In Equation 4, Equation 3A is substituted into Equation 2 to express throughput T in terms of N, m, and C.

$$T = \frac{N}{L} = \frac{N}{m \cdot N + C} \qquad \text{(Equation 4)}$$

Equation 5 expresses maximum throughput Tmax as the limit of Equation 4, as load N goes to infinity. Maximum throughput Tmax represents an upper bound of throughput performance (maximum IOPS) for the storage system.

$$T_{max} = \lim_{N \to \infty} \left[ \frac{N}{m \cdot N + C} \right] \qquad \text{(Equation 5)}$$

Equation 6 evaluates Equation 5 as N goes to infinity. As shown, Tmax reduces to reciprocal of slope m. It should be recognized that slope m is easily measured in an online system, and may be measured substantially independently of other production traffic. Slope m may be measured by generating request traffic to provide sample points along the latency response function 222. The sample points are accumulated and fit to a line equation to yield slope m. Persons skilled in the art will recognize that using Equation 3B will result in an identical limit result for Equation 6.

$$T_{max} = \frac{1}{m} \qquad \text{(Equation 6)}$$

In certain settings, data center operators may wish to configure the storage system to operate at a specific fraction (α) of maximum throughput Tmax. Equation 7, below, solves for a target fractional load $N_\alpha$ given α, and operation at a target throughput of α·Tmax.

$$N_\alpha = \frac{\alpha \cdot C}{m \cdot (1 - \alpha)} \qquad \text{(Equation 7)}$$

Equation 8 may be used to estimate latency performance of the storage system that operates at fraction α of maximum throughput Tmax.

$$L_\alpha = \frac{C}{1 - \alpha} \qquad \text{(Equation 8)}$$

Saturation load, Nsat, may be obtained as the value of N corresponding to a throughput value very close to the peak such as 99% of the peak, i.e., by using α=0.99 in Equation 7 above. Similarly, the corresponding latency at Nsat can be found by using α=0.99 in Equation 8 above.

Figure 2B:
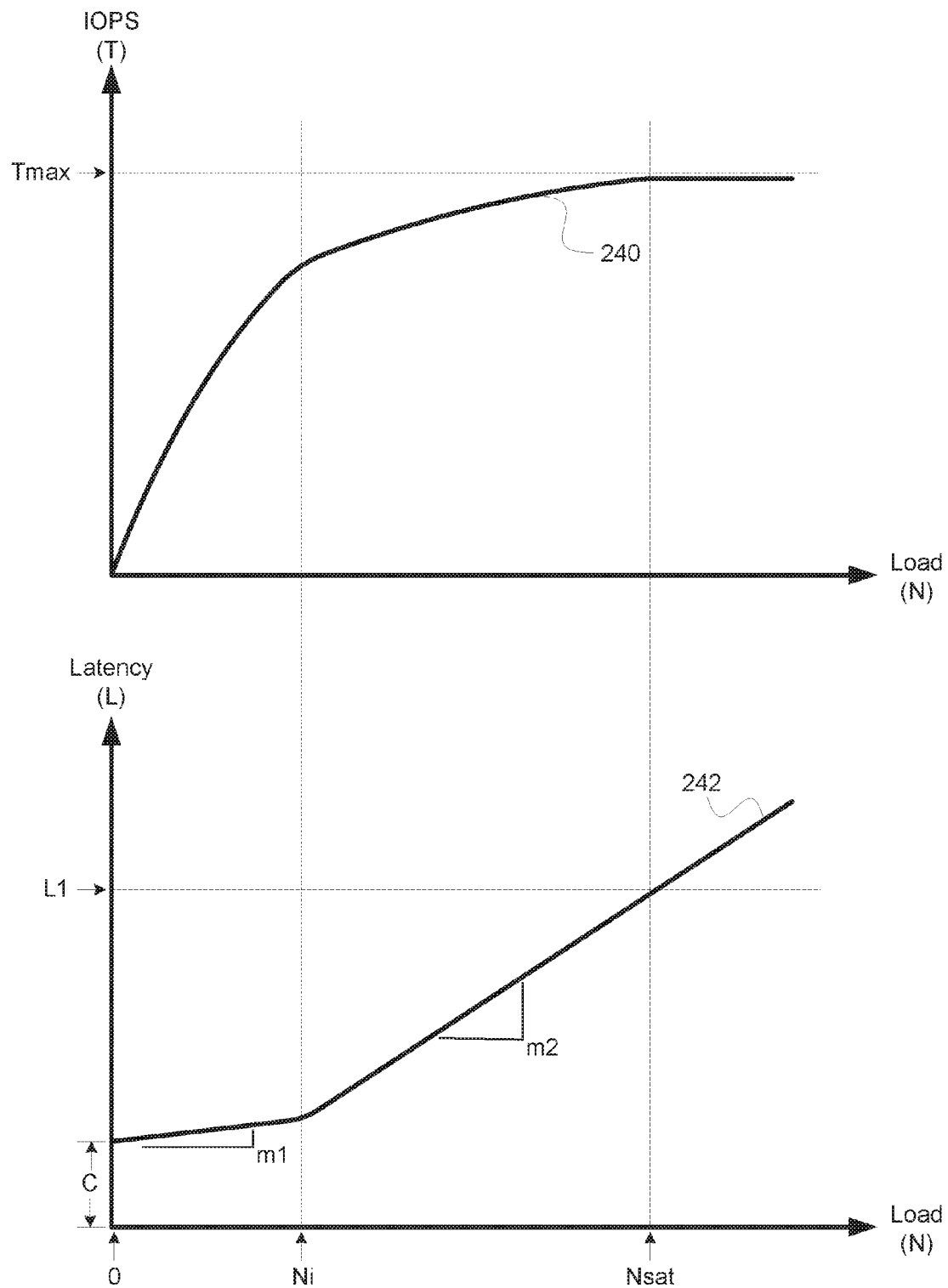
FIG. 2B illustrates relationships among load, latency, and throughput in an arbitrary storage system comprising a relatively large number of independent storage devices, according to one embodiment of the present invention.

FIG. 2B illustrates relationships among load (N), latency (L), and throughput (T) in an arbitrary storage system comprising a relatively large number of independent storage devices, according to one embodiment of the present invention. For a storage system 130 with S storage devices 138, the latency response function 242 increases with slope m1 until an inflection point at load Ni. Above load Ni, the latency response function 242 increases with slope m2.

With S storage devices 138, the storage system is able to service approximately S outstanding requests without significantly increasing latency, leading to a coarse estimate for Load Ni as being approximately equal to S. Equation 9 calculates Ni based only zero intercept C, and slopes m1 and m2.

$$N_i \geq \frac{C}{m_2 - m_1} \qquad \text{(Equation 9)}$$

Throughput response function 240 increases to Tmax at load Nsat. Below load Ni, the throughput response function 240 increases sharply. After load Ni, the throughput response function 240 tapers. Slope m2 may be used for evaluating Equation 6. Alternatively, any technically feasible blend of slopes m1 and m2 may be used for evaluating Equation 6.

Figure 3:
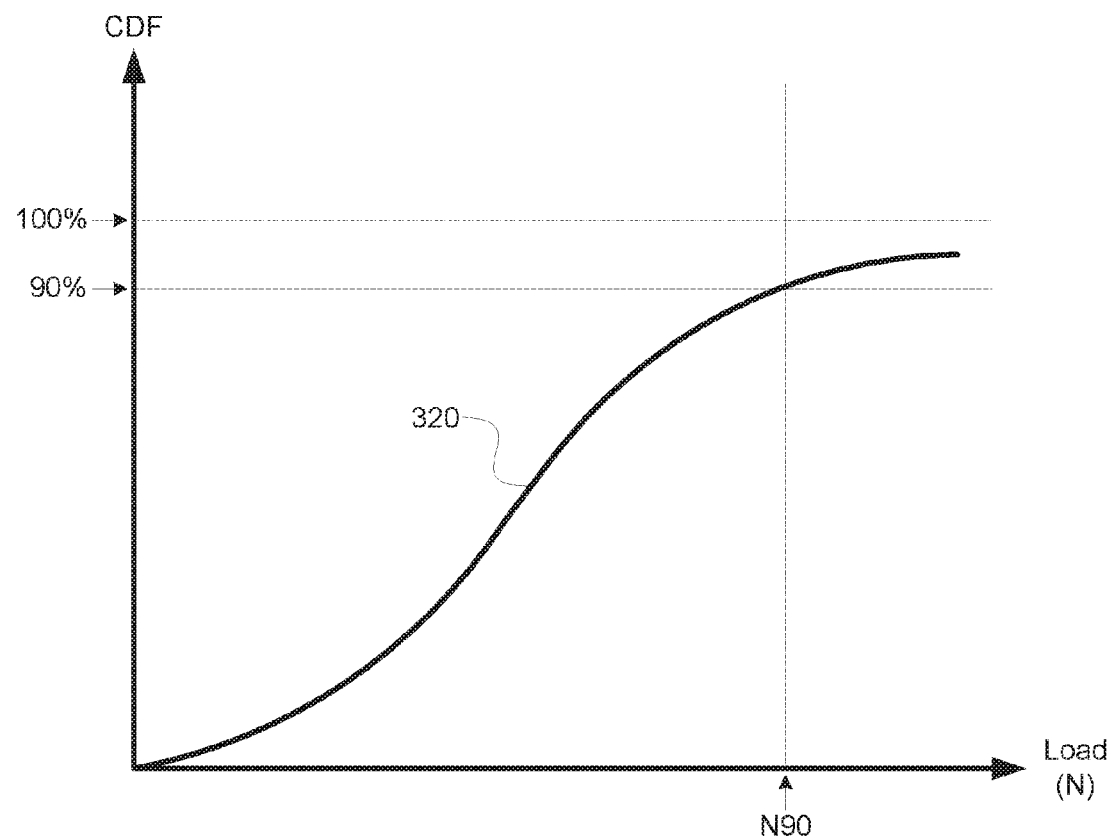
FIG. 3 illustrates a cumulative distribution function for characterizing a storage client, according to one embodiment of the invention.

FIG. 3 illustrates a cumulative distribution function (CDF) 320 for characterizing a storage client, according to one embodiment of the invention. The CDF 320 plots an accumulation of load N as a percentage of run time. The storage client will typically exhibit a storage request behavior that can be characterized in terms of a load N. For example, the client operates at a load N of less than or equal to N90 pending requests ninety percent of the time. A plurality of specific CDFs may collectively characterize the client. For example, specific CDFs for pure read, pure write, pure sequential, and highly random accesses may characterize the client. As discussed in greater detail below, a CDF may be used to help perform certain data center operations, such as determining whether a given client should be admitted for access to a particular storage system.

Figure 4A:
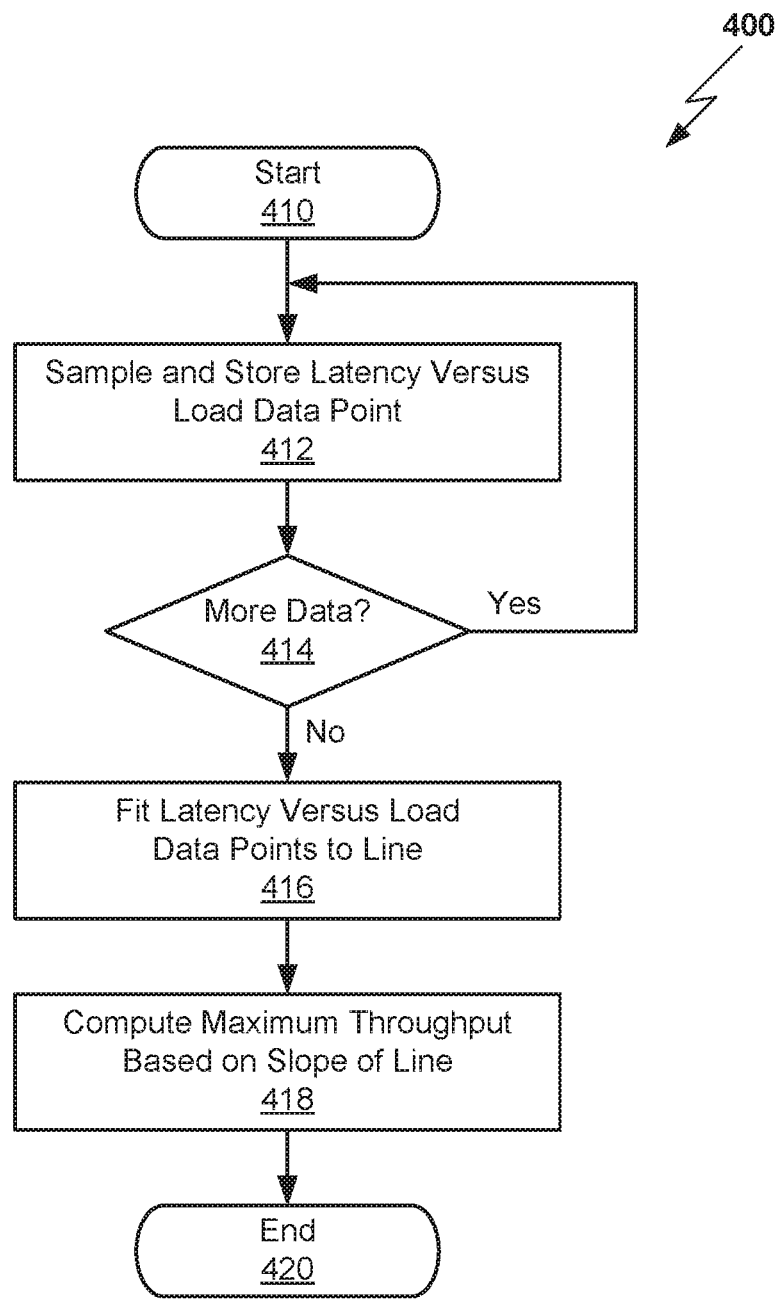
FIG. 4A is a flow diagram of method steps, performed by a storage management agent for computing maximum throughput of a storage system, according to one embodiment of the invention.

FIG. 4A is a flow diagram of method steps 400, performed by a storage management agent for computing maximum throughput of a storage system, according to one embodiment of the invention. Although the method steps are described in conjunction with the system of FIG. 1A, it should be understood that the method steps carried out in any system are within the scope of the invention.

The method begins in step 410, where the management agent, such as management agent 134, starts executing the method. In step 412, the management agent samples and stores a data point reflecting latency versus load in the storage system. Each sample is taken over a period of time, e.g., 20 seconds, and in one embodiment, the average latency is computed over the sample period and the average outstanding IOs are used to represent the load in the storage system. Any technically feasible technique may be used to sample and store the data point. If, in step 414, at least one more data point is needed, then the method proceeds back to step 412. If, however, no more data points are needed, then the method proceeds to step 416, where the latency versus load data points are fit to a line. The line is specified by a slope, corresponding to slope m, and a zero intercept, corresponding to zero intercept C. In step 418, the management agent computes a maximum throughput based on the slope of the line, in accordance with Equation 6. The method terminates in step 420. In one embodiment, maximum throughput is displayed or stored for use by various applications.

Figure 4B:
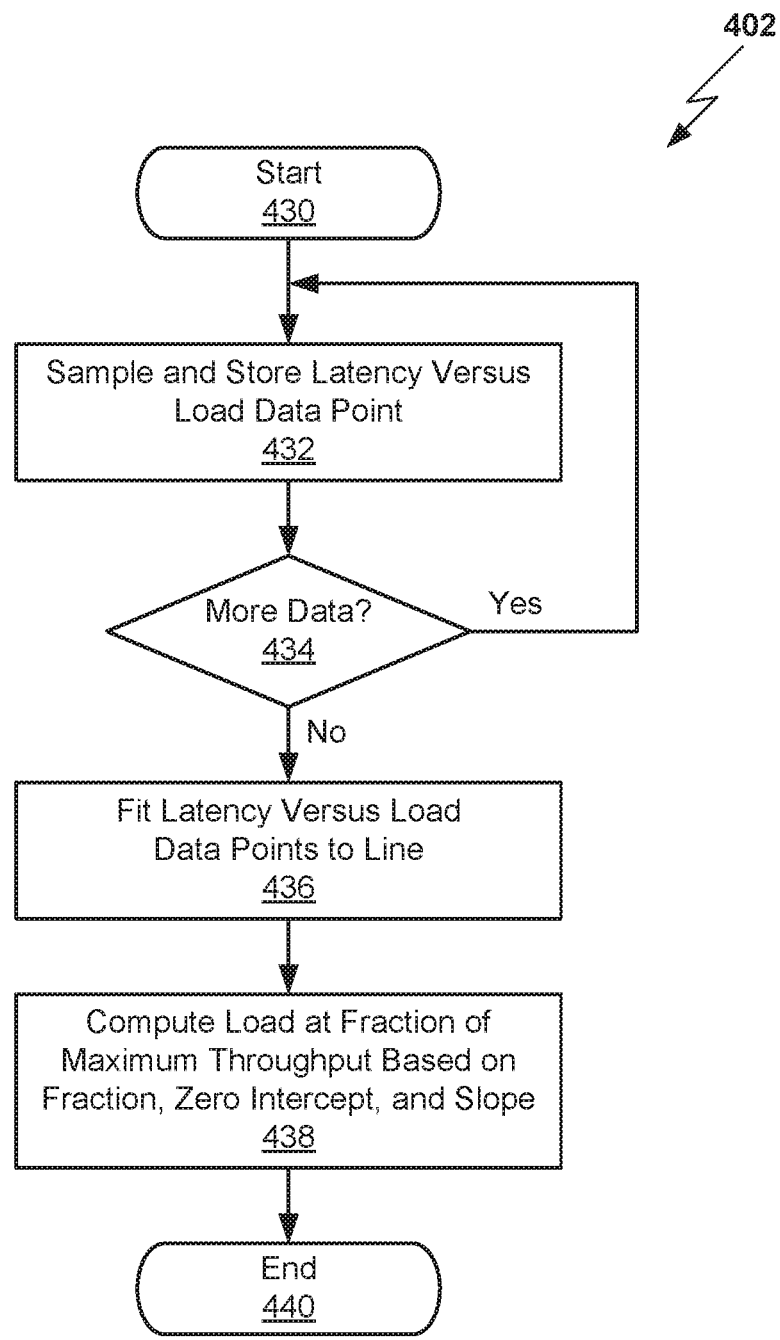
FIG. 4B is a flow diagram of method steps, performed by a storage management agent for computing a load for specific fraction of maximum throughput of a storage system, according to one embodiment of the invention.

FIG. 4B is a flow diagram of method steps 402, performed by a storage management agent for computing a load for a specific fraction of maximum throughput of a storage system, according to one embodiment of the invention. Although the method steps are described in conjunction with the system of FIG. 1A, it should be understood that the method steps carried out in any system are within the scope of the invention.

The method begins in step 430, where the management agent, such as management agent 134, starts executing the method. In step 432, the management agent samples and stores a data point reflecting latency versus load in the storage system. Each sample is taken over a period of time, e.g., 20 seconds, and in one embodiment, the average latency is computed over the sample period and the average outstanding IOs are used to represent the load in the storage system. Any technically feasible technique may be used to sample and store the data point. If, in step 434, at least one more data point is needed, then the method proceeds back to step 432. If, however, no more data points are needed, then the method proceeds to step 436, where the latency versus load data points are fit to a line. The line is specified by a slope, corresponding to slope m, and a zero intercept, corresponding to zero intercept C. In step 438, the management agent computes a load for a specific fraction of maximum throughput based on the fraction, zero intercept, and slope of the line, in accordance with Equation 7. The method terminates in step 440. In one embodiment, load for the specific fraction of maximum throughput is displayed or stored for use by various applications.

Figure 4C:
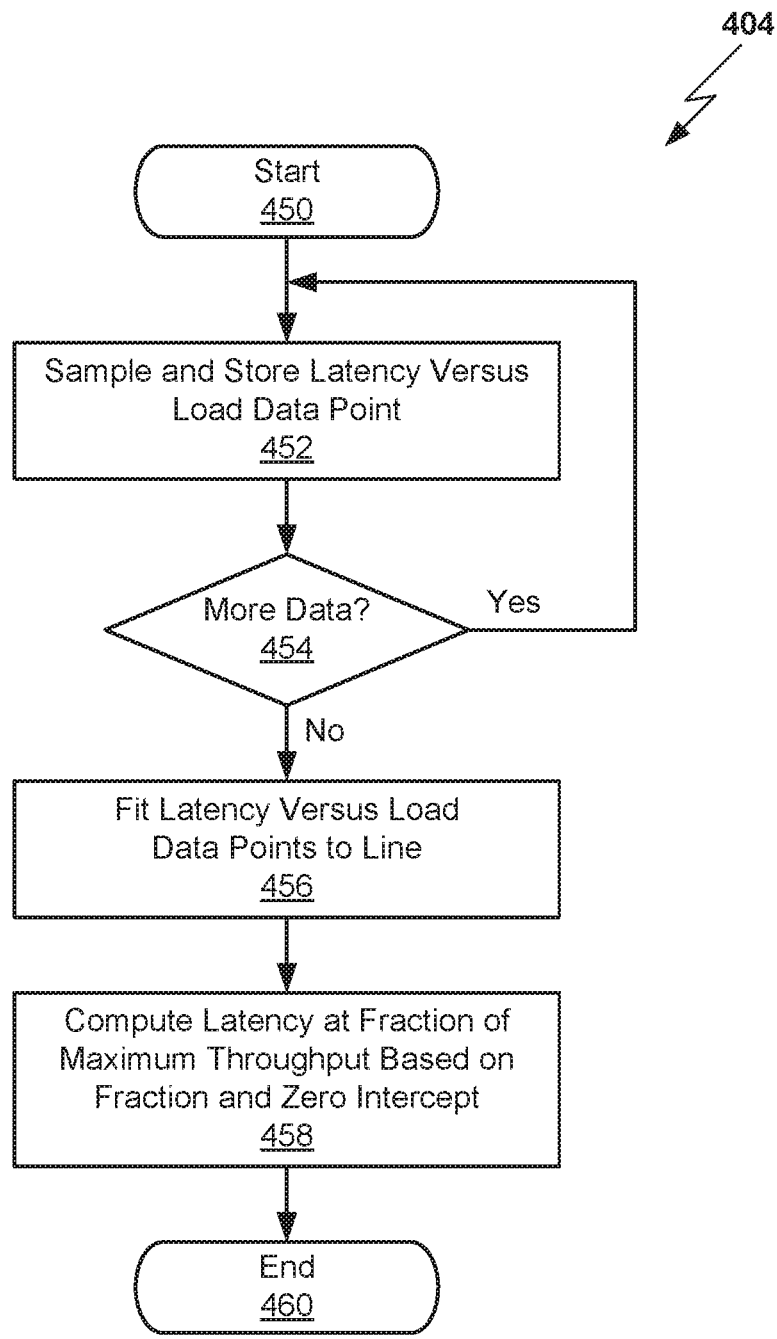
FIG. 4C is a flow diagram of method steps, performed by a storage management agent for computing a latency for specific fraction of maximum throughput of a storage system, according to one embodiment of the invention.

FIG. 4C is a flow diagram of method steps 404, performed by a storage management agent for computing a latency for a specific fraction of maximum throughput of a storage system, according to one embodiment of the invention. Although the method steps are described in conjunction with the system of FIG. 1A, it should be understood that the method steps carried out in any system are within the scope of the invention.

The method begins in step 450, where the management agent, such as management agent 134, is starts executing the method. In step 452, the management agent samples and stores a data point reflecting latency versus load in the storage system. Each sample is taken over a period of time, e.g., 20 seconds, and in one embodiment, the average latency is computed over the sample period and the average outstanding IOs are used to represent the load in the storage system. Any technically feasible technique may be used to sample and store the data point. If, in step 454, at least one more data point is needed, then the method proceeds back to step 452. If, however, no more data points are needed, then the method proceeds to step 456, where the latency versus load data points are fit to a line. The line is specified by a slope, corresponding to slope m, and a zero intercept, corresponding to zero intercept C. In step 458, the management agent computes latency for the specific fraction of maximum throughput based on the fraction, zero intercept, in accordance with Equation 8. The method terminates in step 460. In one embodiment, latency for the specific fraction of maximum throughput is displayed or stored for use by various applications.

Embodiments of the present invention include techniques for capacity planning. By characterizing capacity of a given storage system with respect to a percentage of maximum throughput, procurement decisions may be made based on a predictive model of overall capacity. Similarly, when a given storage system is operating with a given average latency, planners may estimate operating latency with proposed new loads. Procurement decisions may be made accordingly, based on a predictive model of resulting latency.

Figure 5:
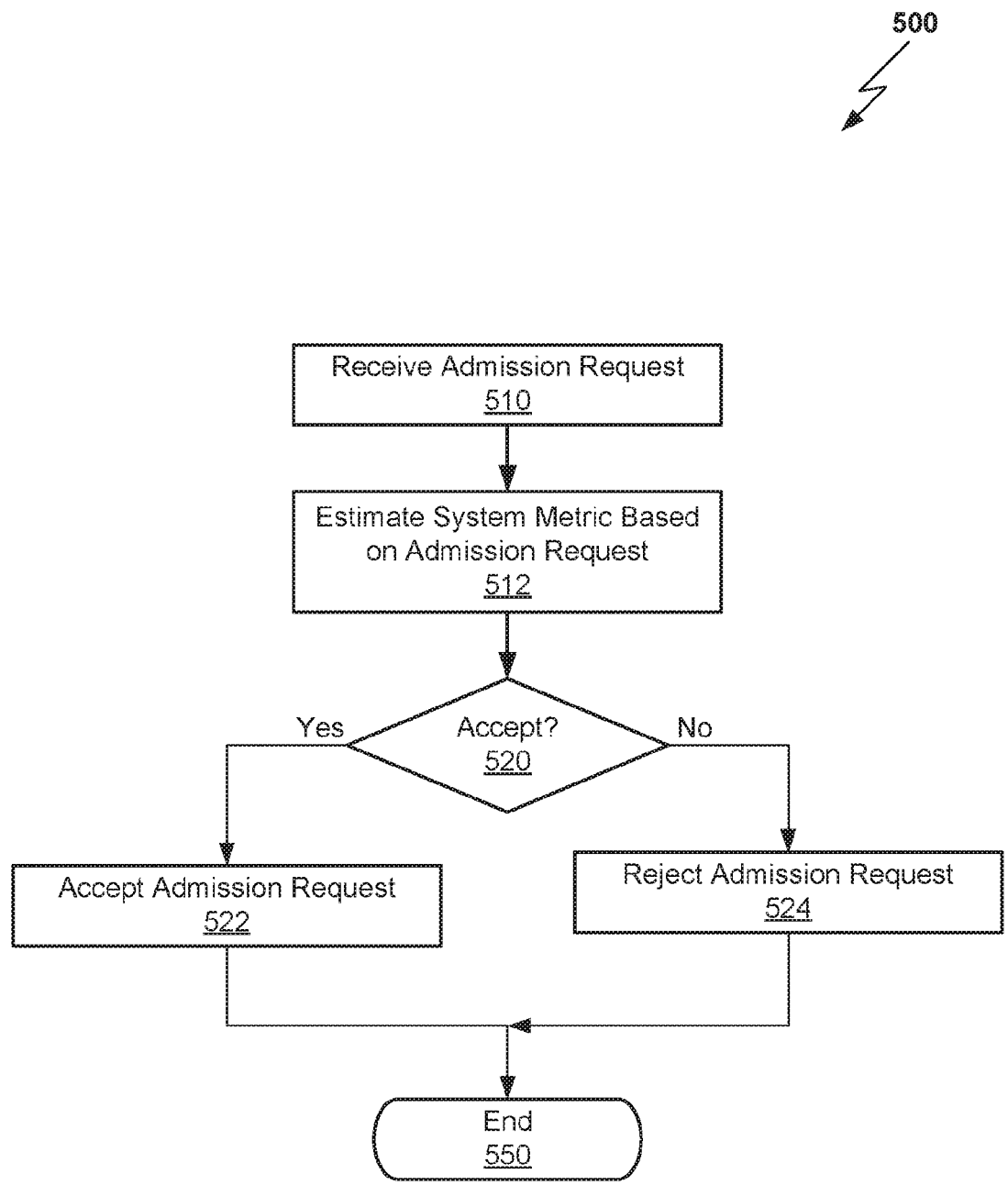
FIG. 5 is a flow diagram of method steps, performed by a storage management agent for admission control of a storage system, according to one embodiment of the invention.

FIG. 5 is a flow diagram of method steps 500, performed by a storage management agent for admission control of a storage system, according to one embodiment of the invention. Although the method steps are described in conjunction with the system of FIG. 1A, it should be understood that the method steps carried out in any system are within the scope of the invention. Method steps 510-550 are repeated while normal operation of the storage system continues.

The method begins in step 510, where the management agent receives an admission request transmitted by a potential client of the storage system. The admission request includes a storage characterization of the client. For example, the storage characterization may include one or more CDFs, as discussed in FIG. 3.

In step 512, the management agent estimates a system metric based on the admission request. In one embodiment, the system metric is total workload. Impact on total workload is evaluated to determine whether admitting the potential client will cause total workload to exceed a threshold, which may be defined as Nsat, the saturation workload, or a specified percentage of Nsat. If accepting the potential client will not exceed the workload threshold, then the admission request should be accepted. Otherwise, the admission request should not be accepted. In an alternative embodiment, latency is the system metric. Impact on total latency is evaluated to determine whether admitting the potential client will cause latency to exceed a particular latency threshold. If accepting the potential client will not exceed the latency threshold, then the admission request should be accepted. Otherwise, the admission request should not be accepted.

If, in step 520, the admission request should be accepted, then the method proceeds to step 522, where the management agent accepts the admission request. If, however, in step 520, the admission request should not be accepted, then the method proceeds to step 524, where the management agent rejects the admission request. The method terminates in step 550.

Figure 6:
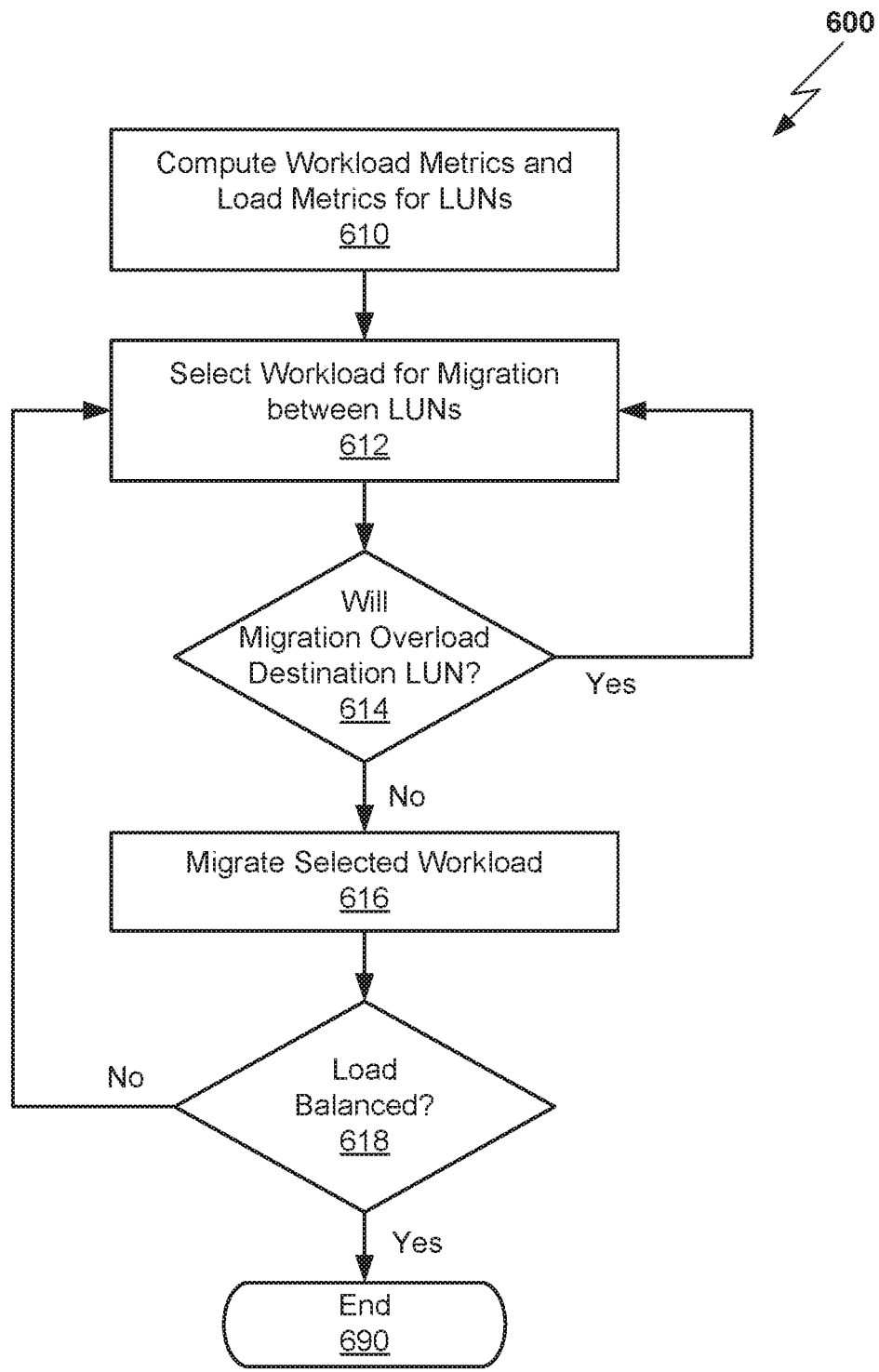
FIG. 6 is a flow diagram of method steps performed by a storage resource manager for storage load balancing, according to one embodiment of the invention.

FIG. 6 is a flow diagram of method steps 600 performed by a storage resource manager for storage load balancing, according to one embodiment of the invention. Although the method steps are described in conjunction with the system of FIG. 1B, it should be understood that the method steps carried out in any system are within the scope of the invention. The storage resource manager may be one of hosts 110, VMs running in hosts 110, or a central host that manages hosts 110.

The method begins in step 610, where a storage resource manager computes load metrics for LUNs in the system of FIG. 1B. Load metrics for LUNs are computed in the manner described in U.S. patent application Ser. No. 12/566, 435, filed Sep. 24, 2009, the entire contents of which are incorporated by reference herein. In step 612, the storage resource manager selects a workload to migrate from its current LUN to a destination LUN in accordance with the heuristics described in U.S. patent application Ser. No. 12/566,435. In one embodiment, the loadings on the LUNs are evaluated based on their latency metrics, and the source LUN and the destination LUN are selected such that source has higher latency compared to the destination. Step 614 checks to see if the migration of the selected workload to the destination LUN will overload the destination LUN. Overloading may be determined if the workload increase in the destination LUN as a result of the migration causes workload saturation in some applications and reaching a specific fraction of workload saturation (e.g., 90%) in other applications. If overloading will occur, another workload is selected for migration or the same workload is selected for migration to a different LUN. If overloading will not occur, the selected workload is migrated to the destination LUN (step 616). The selected workload is migrated from the current LUN to the destination LUN using any technically feasible technique. For example, if the workload is a virtual machine workload, the migration of the workload may be performed using a software tool similar to VMware Storage VMotion that is available from VMware, Inc. of Palo Alto, Calif. Step 618 checks to see if the storage system is load balanced. If the storage system is still not load balanced, method 600 proceeds to step 612 where another workload is selected for migration. If the storage system is load balanced, method 600 terminates in step 690.

Figure 7:
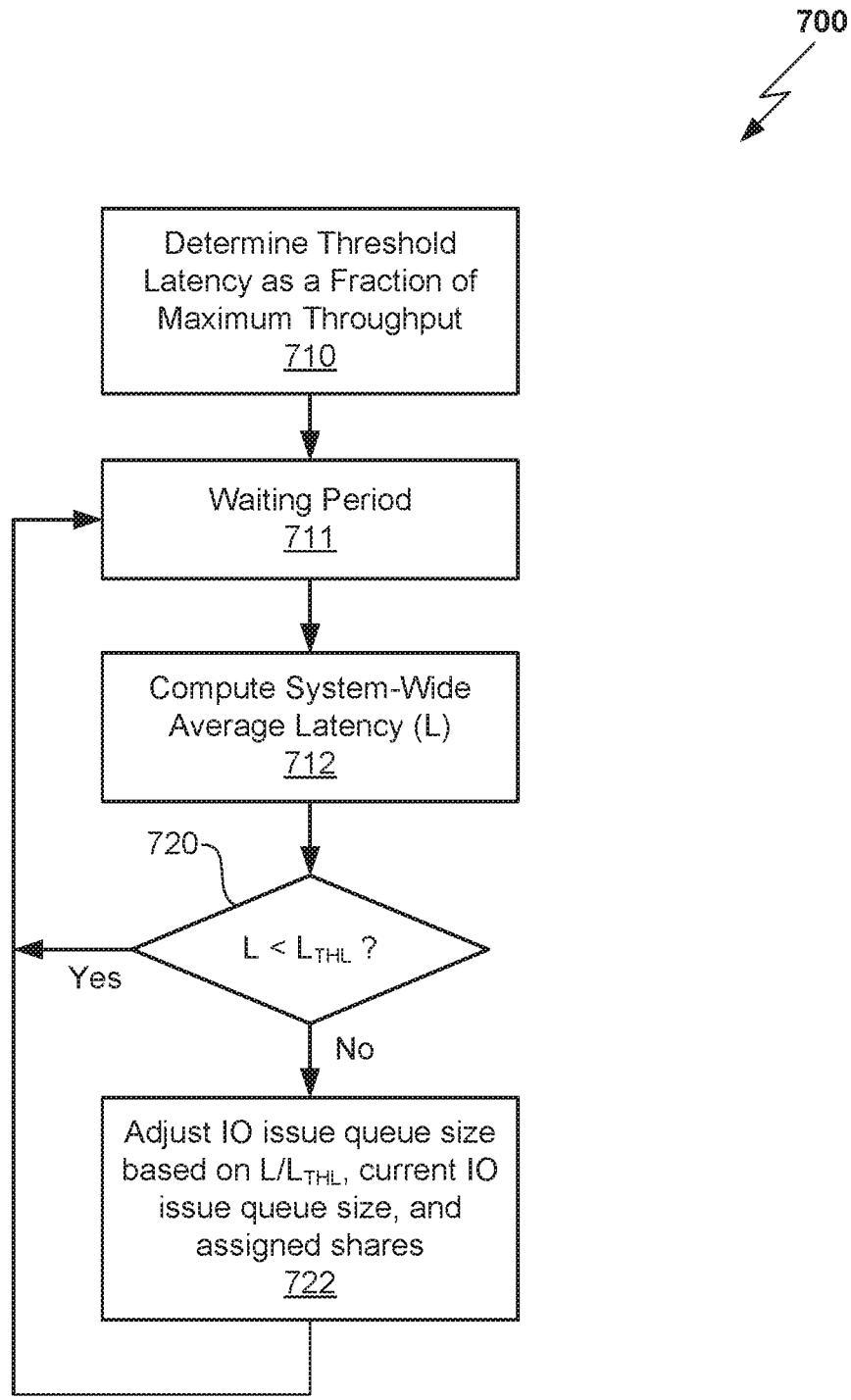
FIG. 7 is a flow diagram of method steps performed by each of multiple hosts that share a common storage system to adjust IOs to the common storage system, according to one embodiment of the invention.

FIG. 7 is a flow diagram of method steps 700, performed by each of multiple hosts that share a common storage system, to adjust IOs to the common storage system, according to one embodiment of the invention. Method steps 700 are carried out by each host 110 in FIG. 1A as a way to throttle IOs to the common storage system so that a predefined quality of service to each of hosts 110 can be achieved according to assigned shares. Throttling of IOs and unthrottlling of IOs are carried out by decreasing and increasing IO issue queue sizes in the manner described in U.S. patent application Ser. No. 12/260,041, filed Oct. 28, 2008, the entire contents of which are incorporated by reference herein. Although the method steps are described in conjunction with the system of FIG. 1A, it should be understood that the method steps carried out in any system are within the scope of the invention.

The method begins in step 710, where threshold latency ($L_{THL}$) is determined as latency of the common storage system operating at maximum throughput or fraction α (e.g., 9/10) of maximum throughput in accordance with Equation 8. After a waiting period of a predefined duration (step 711), the system-wide average latency across all hosts that share the common storage system, denoted herein as L, is computed in step 712 in the manner described in U.S. patent application Ser. No. 12/260,041, filed Oct. 28, 2008. Step 720 compares L with $L_{THL}$. If L is less than $L_{THL}$, method 700 returns to step 711. If, on the other hand, L is greater than or equal to $L_{THL}$, the IO issue queue size of the host is adjusted in step 722 in the manner described in U.S. patent application Ser. No. 12/260,041. The factors for the adjustment include $L/L_{THL}$, the current IO issue queue size, and the assigned shares. After step 722 is executed, method 700 returns to step 711.

Figure 8:
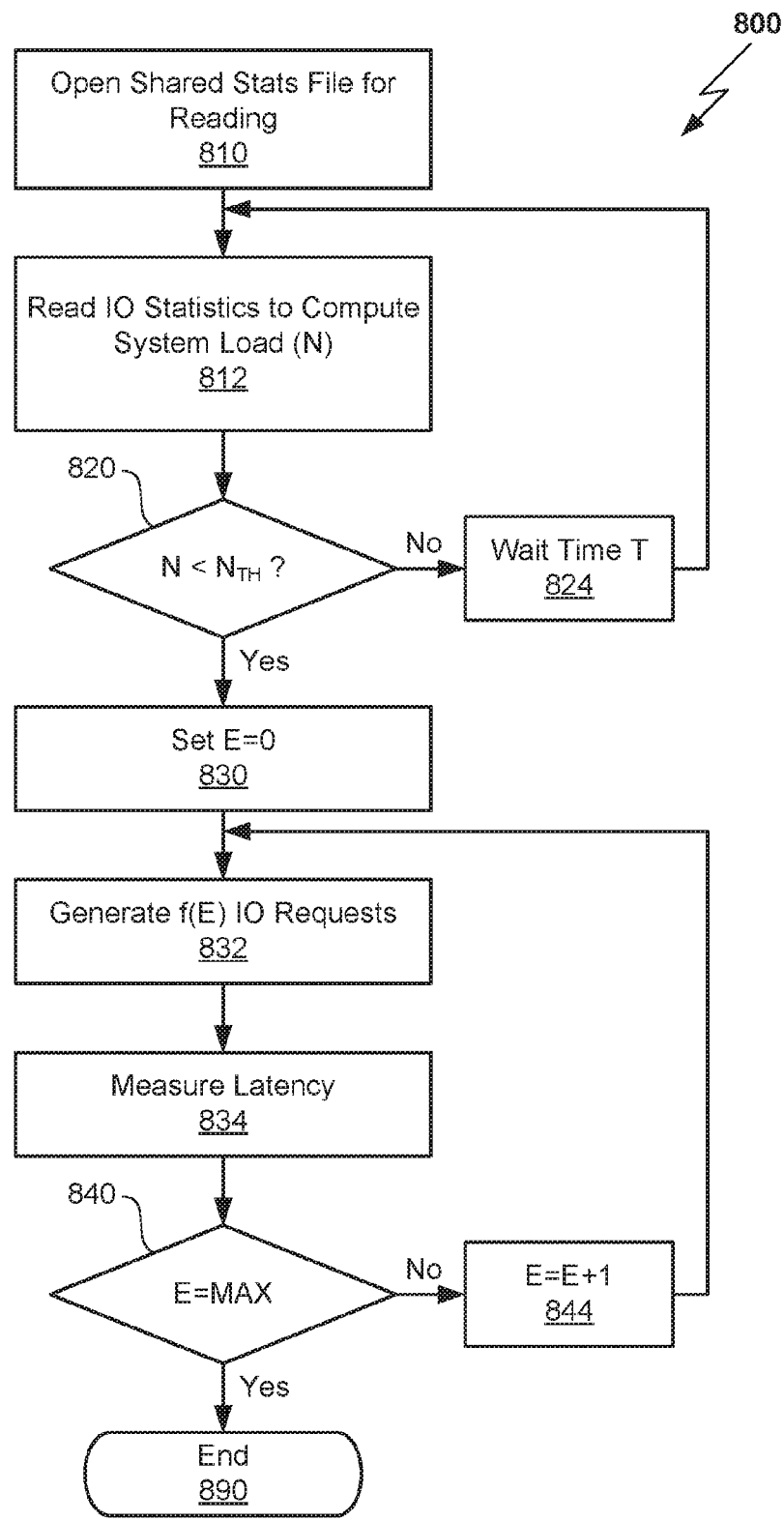
FIG. 8 is a flow diagram of method steps performed by a measurement agent during idle periods to estimate maximum I/O throughput performance of a storage system, according to one embodiment of the present invention.

FIG. 8 is a flow diagram of method steps 800, performed by a measurement agent during idle periods to estimate maximum I/O throughput performance of a storage system, according to one embodiment of the present invention. As stated previously in Equation 6, maximum I/O throughput (Tmax) of a storage system is a reciprocal of the slope of a linear relationship between latency (L) and load (N). One challenge in measuring data points of latency versus load in an online setting is that other, unrelated, production workloads tend to interfere with controlled measurements of latency and load. Furthermore, performing a controlled measurement of latency versus load tends to interfere with normal production workloads, thereby undermining the goal of performance optimization within the storage system. The measurement agent is a software application executing on at least one host within a system of hosts and storage systems.

The measurement agent is configured to read a shared statistics (stats) file stored on an arbitrary storage system. A plurality of hosts are configured to write to a specific portion of the stats file and to maintain at least current measured latency and load information for workloads associated with the host. The latency and load information is periodically updated within the specific portion of the stats file. The measurement agent periodically reads the shared stats file to find idle periods in which to perform controlled measurements for latency versus load.

The method begins in step 810, where the measurement agent opens the shared stats file for reading. In step 812, the measurement agent reads IO statistics for each host accessing a particular storage system to compute a load N for the storage system. For example, the measurement agent may sum up all pending loads for each host to compute a load N for the storage system. If, in step 820 the load N is less than a threshold ($N_{TH}$), then the storage system is determined to be in an idle period and the method proceeds to step 830. The load may be expressed as OIOs and the threshold load may be 0, 1, or a different low number. In step 830, a variable E is set to zero. In step 832, the measurement agent generates IO requests according to a function f(E), which generates a load of f(E) to the storage device. In one embodiment, f(E) is equal to two raised to the power E. That is, $f(E)=2^E$. When E=0, one IO request is generated; when E=1, two IO requests are generated; when E=2, four IO requests are generated, and so forth. In step 834 the measurement agent measures latency for the offered load. If, in step 840, E is equal to a maximum value MAX then the method terminates in step 890. Otherwise, if E is not equal to MAX, then the method proceeds to step 844, where E is incremented by one.

Returning to step 820, if the load N is not less than threshold $N_{TH}$, then the method proceeds to step 824, where the measurement agent waits for an amount of time determined by a parameter T.

Once the data points for latency versus load are sampled, the data points are processed using any technically feasible linear fit function to compute a slope for a representative line. For example, a linear least squares fit may be used to determine a linear slope for the data points. A reciprocal of the slope determines Tmax for the storage device. In one embodiment, the method steps 800 are performed for each storage device within a system of storage devices to measure latency versus load to determine Tmax for each storage device.

It should be recognized that various modifications and changes may be made to the specific embodiments described herein without departing from the broader spirit and scope of the invention as set forth in the appended claims.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A non-transitory computer-readable storage medium embodying computer program instructions for controlling admissions of a workload into a storage unit, the computer program instructions implementing operations comprising:
   computing a threshold latency or a threshold workload corresponding to a predefined fraction of a maximum throughput of the storage unit;
   estimating a total latency or a total workload that would result if the workload is admitted;
   comparing the estimated total latency or the total workload with the threshold latency or the threshold workload, respectively; and
   admitting the workload if the estimated total latency is less than the threshold latency or the total workload is less than the threshold workload.

2. The non-transitory computer-readable storage medium of claim 1, wherein the predefined fraction is either 100% or less than 100%.

3. The non-transitory computer-readable storage medium of claim 1, wherein:
   the threshold latency is determined based on the predefined fraction and a zero intercept of a line that characterizes a relationship between workload on the storage unit and latency of the storage unit; or
   the threshold workload is determined based on the predefined fraction and a slope and the zero intercept of the line that characterizes the relationship between workload on the storage unit and latency of the storage unit.

4. The non-transitory computer-readable storage medium of claim 3, the operations further comprising:
   monitoring one or more workloads on the storage unit and a latency of the storage unit at multiple points in time over a period of time;
   performing a linear fit between the one or more monitored workloads and the monitored latencies to determine the line that characterizes the relationship between workload on the storage unit and latency of the storage unit.

5. The non-transitory computer-readable storage medium of claim 4, wherein the one or more workloads on the storage unit are monitored by monitoring outstanding IOs to the storage unit.

6. The non-transitory computer-readable storage medium of claim 1, the operations further comprising:
   receiving a request from a client to admit the workload, wherein the request includes a storage characterization of the client, the storage characterization including one or more cumulative distribution functions indicating an accumulation of load as a percentage of run time, and wherein the total latency or the total workload is estimated based on the storage characterization of the client.

7. The non-transitory computer-readable storage medium of claim 1, wherein the maximum throughput of the storage unit is determined as an inverse of a slope of a line that characterizes a relationship between workload on the storage unit and latency of the storage unit.

8. The non-transitory computer-readable storage medium of claim 7, the operations further comprising:
   detecting an idle period of time for the storage unit; and
   injecting controlled loads into the storage unit over the period of time,
   wherein the line is determined based on a linear fit of measured latencies versus corresponding loads.

9. The non-transitory computer-readable storage medium of claim 8, wherein the controlled loads include IO requests that are generated repeatedly over multiple time intervals and the number of IO requests generated at each subsequent time interval increases.

10. The non-transitory computer-readable storage medium of claim 1, the operations further comprising:

rejecting the workload if the estimated total latency is greater than the threshold throughput.

11. A non-transitory computer-readable storage medium embodying computer program instructions for load balancing workloads across storage units in a storage system, the computer program instructions implementing operations comprising:

selecting a workload for migration to a destination storage unit;

determining whether or not migration of the selected workload to the destination storage unit will cause the destination storage unit to reach a predefined fraction of a saturation workload; and migrating the selected workload to the destination storage unit if the predefined fraction of the saturation workload of the storage unit will not be reached.

12. The non-transitory computer-readable storage medium of claim 11, wherein the predefined fraction is either 100% or less than 100%.

13. The non-transitory computer-readable storage medium of claim 11, wherein the predefined fraction of the saturation workload of the storage unit is determined based on the predefined fraction, a slope of a line that characterizes a relationship between monitored workloads on the storage unit and monitored latencies of the storage unit, and a zero intercept of the line.

14. The non-transitory computer-readable storage medium of claim 11, wherein, if the predefined fraction of the saturation workload of the storage unit will be reached, then the selected workload is migrated to a different storage unit or another workload is selected for migration to the destination storage unit.

15. The non-transitory computer-readable storage medium of claim 11, the operations further comprising:

determining whether the storage system is load balanced after migrating the selected workload; and if the storage system is not load balanced, selecting another workload for migration.

16. A computer system comprising a plurality of hosts sharing a common storage unit, wherein each host comprises:

a processor; and a memory, wherein the memory includes a program configured for execution by the processor to perform operations for enforcing a quality of service policy, the operations comprising:

determining an average latency across all of the hosts;

comparing the average latency with a threshold latency; and adjusting an IO issue queue size of the host, wherein the threshold latency is determined as latency of the common storage unit operating at a predefined fraction of maximum throughput.

17. The computer system of claim 16, wherein the predefined fraction is either 100% or is less than 100%.

18. The computer system of claim 16, wherein the latency of the common storage unit operating at the predefined fraction of maximum throughput is determined based on the predefined fraction and a zero intercept of a line that characterizes a relationship between monitored workloads on the common storage unit and monitored latencies of the common storage unit.

19. The computer system of claim 16, wherein the IO issue queue sizes of the host is adjusted based in part on assigned shares of the hosts.

20. The computer system of claim 19, wherein the IO issue queue size of the host is adjusted based on a ratio of the average latency across all of the hosts to the threshold latency, a current IO issue queue size, and the assigned shares.

* * * * *